United States Patent [19]
Konrad et al.

[11] Patent Number: 4,490,125
[45] Date of Patent: Dec. 25, 1984

[54] LUBRICATED WIDE ANGLE JOINT

[75] Inventors: Mathias Konrad, Troisdorf; Paul Herchenbach, Ruppichteroth; Klaus Kämpf, Lohmar, all of Fed. Rep. of Germany

[73] Assignee: Jean Walterscheid GmbH, Lohmar, Fed. Rep. of Germany

[21] Appl. No.: 421,981

[22] Filed: Sep. 23, 1982

[30] Foreign Application Priority Data

Sep. 25, 1981 [DE] Fed. Rep. of Germany ....... 3138190

[51] Int. Cl.³ ........................... F16D 3/26; F16D 3/16
[52] U.S. Cl. ...................................... 464/11; 464/118; 464/905
[58] Field of Search .................... 464/7, 11, 12, 13, 14, 464/114, 117, 118, 905

[56] References Cited

U.S. PATENT DOCUMENTS

| 724,068 | 3/1903 | Williams | 464/905 X |
| 1,949,500 | 3/1934 | Swenson | 464/14 |
| 1,987,807 | 1/1935 | Swenson | 464/13 |
| 2,067,286 | 1/1937 | Pearce | 464/118 |
| 3,470,712 | 10/1969 | Geisthoff et al. | 464/11 X |
| 4,257,243 | 3/1981 | Herchenbach | 464/118 |

FOREIGN PATENT DOCUMENTS 552646 6/1932 Fed. Rep. of Germany.
2822586 11/1978 Fed. Rep. of Germany ...... 464/118

Primary Examiner—Stuart S. Levy
Assistant Examiner—Daniel P. Stodola
Attorney, Agent, or Firm—Toren, McGeady and Stanger

[57] ABSTRACT

A wide angle joint which permits good lubrication in any of its possible angular positions is formed with joint cross pieces which are each provided on their interior sides with a partially spherical recess connected with at least one of the lubricating channels which extend through the joint cross pieces with spherical trunnions being provided which also have partially spherical shoulders reaching through a bridge which joins the outer yokes of the joint. The midpoints of the partially spherical recesses are the partially spherical shoulders lie at an intersecting point of the two axes of the joint cross piece and the spherical trunnions each have a bore hole extending in the axial direction.

3 Claims, 1 Drawing Figure

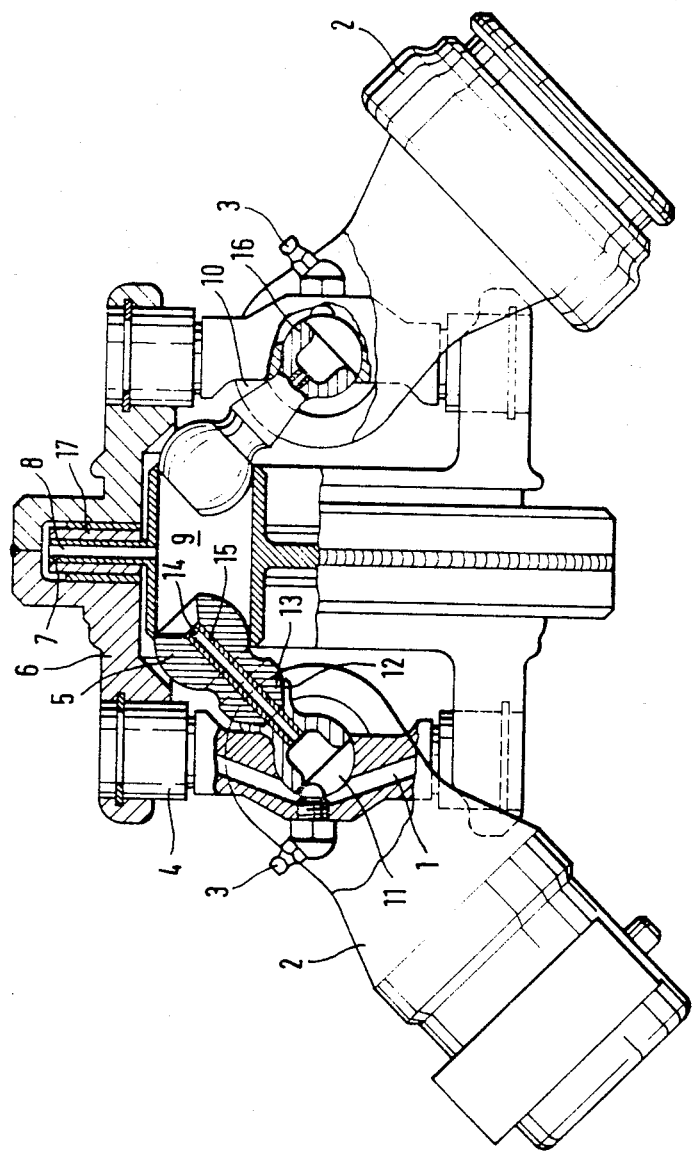

LUBRICATED WIDE ANGLE JOINT

The present invention relates generally to universal joints and more particularly to a lubricated wide angle joint which is composed of an inner double fork and a pair of outer yokes, each of which is connected with the double fork by means of a joint cross piece.

In a joint of the type to which the present invention relates, the outer yokes are guided by means of spherical trunnions arranged on ends connected with the yokes by means of a bridge and facing toward the middle of the joint. Each end engages a guide provided on a centering disc which is secured against axial displacement, but which is radially movable. The two trunnion crosses are provided with lubricating nipples arranged at the center thereof which open into lubricating channels leading into the trunnion bearings.

A joint wherein a double fork is inwardly controlled by means of a bore cooperating with a spherical surface, in which double fork the lubricating medium is partly guided through the spherical trunnions, is known from German Patent No. 552 646. The device described therein concerns a so-called oscillating joint in which the joint connections directed outwardly are each supported in an assigned joint ring by means of a trunnion. The two joints are connected with one another by means of an intermediate ring which is formed so as to be hollow on the interior and which serves at the same time as a lubricant reservoir. The lubricant is inserted into the reservoir under pressure and guided through channels to the pivot trunnions of the joints as well as into the effective area of the centering ball/spherical surface.

However, experience has shown that feeding of lubricant from an exterior area into the interior of such a joint is difficult in rotating joints. In practice, difficulties are encountered in particular with regard to accurate guiding of the lubricant into the center of the joint from the exterior thereof. Additionally, because of the centrifugal forces which occur, the lubricant is forced into the outer areas of the joint and tends to collect there. In joints which are kept in rotation for extended periods of time, the entire interior of the joint will empty itself of lubricant after a certain period of time and lubricant will be difficult to supply for reasons discussed above so that lubrication of the joint becomes problematic.

The present invention is directed toward the provision of a wide angle joint which may be lubricated in any possible angular position of the joint and within which lubricant feed is effected through the center of the joint, with the lubrication of the outlying areas being secured by means of the effect of centrifugal forces.

SUMMARY OF THE INVENTION

Briefly, the present invention may be described as a lubricated wide angle joint which includes an inner double fork and two outer yokes each connected with the double fork by means of a joint cross piece, spherical trunnions guiding the outer yokes arranged on the ends thereof facing toward the center of the joint, the ends being connected with the yokes by means of a bridge, a guide provided with a centering disc having the spherical trunnions engaged therein, said centering disc being secured against axial displacement but being radially movable, and lubricating nipples provided on the trunnions and arranged in the middle thereof opening into lubricating channels leading into the trunnion bearings. The present invention relates to an improvement in such a lubricated wide angle joint comprising that each joint cross piece is provided on its inner side with a partially spherical recess connected with at least one of the lubricating channels, that the spherical trunnions are provided with a partially spherical shoulder reaching through the bridge toward the outer part of the joint, that the midpoints of the partially spherical recess and the partially spherical shoulder lie in the intersecting point of the two axes of the joint cross piece, and that the spherical trunnions are provided with an axial through bore hole.

The lubrication feed into the interior of the wide angle joint is effected exclusively through the recesses and openings located in the low-stress zones of the component parts. No weakening of the joint occurs as a result of the torque which is transmitted.

Since the two single lubricating nipples are arranged on the longitudinal axis of the joint, a one-sided imbalance is avoided by arrangement of the lubricating nipples on the outside of the joint. Moreover, the risk of injury is practically eliminated due to the lack of projecting parts.

In a further embodiment of the invention, the improvement comprises that the spherical trunnions are each provided with a shoulder reaching through the bridge toward the exterior of the joint, that an inner cone corresponding to the shoulder is provided on the partially spherical shoulder, and that the partially spherical shoulder is provided with an axial through bore hole.

In this embodiment, the partially spherical shoulder may consist of, for example, elastic material which is inserted in the recess or recesses with pretensioning and the impermeability of the ball swivelling connection with regard to the discharge of the lubricating nipple is ensured.

In accordance with a further characteristic feature of the invention, a tube is supported in both of the through holes of the spherical trunnions and the partially spherical shoulders.

A further improvement of the sealing ring between the spherical trunnions and the partially spherical shoulders is thereby ensured in that both parts are at the same time supported so as to be mutually centered.

The various features of novelty which characterize the invention are pointed out with particularity in the claims annexed to and forming a part of this disclosure. For a better understanding of the invention, its operating advantages, and specific objects attained by its use, reference should be had to the accompanying drawings and descriptive matter in which there are illustrated and described preferred embodiments of the invention.

DESCRIPTION OF THE DRAWING

The single FIGURE of drawing is a sectional view showing a wide angle joint in accordance with the present invention wherein the left side of the joint exemplifies one embodiment of the invention and the right side of the joint exemplifies another embodiment.

DETAILED DESCRIPTION OF THE PREFERRED EMBODIMENTS

Referring now to the drawing wherein there is depicted a wide angle joint exemplifying two different embodiments of the invention, in the right-hand side of the drawing there is shown an embodiment of the lubricated wide angle joint wherein the spherical trunnions 5 are connected in one piece with a partially spherical shoulder 16.

On the left-hand side of the drawing, there is shown an embodiment wherein the spherical trunnion 5 is provided with a truncated cone 13 which engages in an inner cone 12 of the partially spherical shoulder 16.

Of course, it will be apparent that other structural embodiments of the truncated cone/inner cone arrangement are possible, for example a prismatic or barrel-shaped construction of the contact faces.

The wide angle joint shown in the drawing includes joint cross pieces 4 which are each provided with lubricating nipples 3 having exit bore holes which open into lubricating bore holes leading to the trunnion bearings, in a manner known in joint cross pieces. The partially spherical recesses 11 in the center of the joint cross piece 4 have an open through-passage to the lubricating bore holes 1 and to an outlet of the lubricating nipple 3, respectively. The partially spherical shoulder 16 connected to the spherical trunnion 5 engages in a correspondingly formed recess 11 in such a manner that its midpoints lie in the intersecting point of the two axes of the joint cross piece 4.

During lubrication of the wide angle joint, lubricant or grease is first pressed through the lubricating bore holes 1 to the bearings of the joint cross pieces 4 and secondly through the partially spherical recess 11 and the partially spherical shoulder 16 through the axial through bore hole 14 of the spherical trunnion 5 into guides 9 arranged on a centering disc 7 and through radially extending lubricating bore holes 8 provided in the centering disc 7 into a motion-free space of the centering disc 7 located in an inner double fork 6. Floating discs 17 are arranged on both sides of the centering disc 7 and by means of the floating discs 17 uniform distribution of the grease or lubricant in the movement- or motion-free space of the centering disc 7 is sustained.

In the embodiment shown on the left side of the drawing, the partially spherical shoulder 16 is provided with an inner cone 12 or the like which comprises a shoulder 13 projecting from the bridge 10 and connected with the spherical trunnion 5. It will be apparent that the partially spherical shoulder 16 with its inner cone 12 or the like can be a separate component part. The two component parts 5 and 13 are provided with corresponding axial bore holes. In order to improve the sealing characteristics between these two parts and to improve their connection, a common tube 15 may be inserted in the axial bore holes.

Thus, it will be seen that, with the present invention, outer yokes 2 are connected in the wide angle joint in the manner indicated and appropriate lubrication is provided by the arrangement described.

While specific embodiments of the invention have been shown and described in detail to illustrate the application of the inventive principles, it will be understood that the invention may be embodied otherwise without departing from such principles.

What is claimed is:

1. In a lubricated wide angle joint including an inner double fork with two outer yokes each connected with said double fork by means of a joint crosspiece, spherical trunnions guiding said outer yoke arranged on the ends of said outer yokes facing the center of the joint, which ends are connected with said yokes by means of a bridge, a guide provided with a centering disc, said centering disc having said spherical trunnions engaged therein, said centering disc being secured against axial displacement but being radially movable, and lubricating nipples provided on each said joint crosspiece and arranged in the middle thereof opening into lubricating channels leading into trunnion bearings, the improvement comprising:

that said joint crosspieces are provided on their inner sides with a partially spherical recess connected with at least one of said lubricating channels;

that said spherical trunnions are provided with a partially spherical shoulder located within said partially sperical recess;

that the midpoints of said partially spherical recess and said partially sperical shoulder lie in the intersecting point of the two axes of the joint crosspiece; and that said spherical trunnions are provided with an axial through bore hole in flow communication with said spherical recess for effecting lubricant flow therethrough;

said joint being arranged to enable lubricant flow for said centering disc through said nipples and through said partially spherical recesses into said axial through bore holes.

2. A joint according to claim 1 wherein said spherical trunnions are each provided with a shoulder reaching through said bridge, wherein an inner cone which corresponds to said shoulder of the spherical trunnions is provided on said partially spherical shoulder, and wherein said partially spherical shoulder is provided with said axial through bore hole.

3. A joint according to claim 2 wherein a tube is supported in each of said through bore holes of said spherical trunnions and said partially spherical shoulder.

* * * * *